US008625020B2

(12) United States Patent
Cheong et al.

(10) Patent No.: US 8,625,020 B2
(45) Date of Patent: Jan. 7, 2014

(54) METHOD AND APPARATUS FOR OPERATING CAMERA FUNCTION IN PORTABLE TERMINAL

(75) Inventors: Cheol-Ho Cheong, Seoul (KR); Dong-Hoon Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 204 days.

(21) Appl. No.: 13/111,227

(22) Filed: May 19, 2011

(65) Prior Publication Data

US 2011/0298940 A1     Dec. 8, 2011

(30) Foreign Application Priority Data

Jun. 7, 2010   (KR) .................. 10-2010-0053223

(51) Int. Cl.
*H04N 5/222*     (2006.01)
(52) U.S. Cl.
USPC ................................ 348/333.06; 348/333.02

(58) Field of Classification Search
USPC ............................... 348/333.01–333.12, 373
See application file for complete search history.

(56) References Cited

U.S. PATENT DOCUMENTS

| | | | |
|---|---|---|---|
| 2007/0004451 A1* | 1/2007 | Anderson | 455/556.1 |
| 2007/0070184 A1* | 3/2007 | Kim et al. | 348/14.02 |
| 2008/0002963 A1* | 1/2008 | Chuang et al. | 396/310 |
| 2008/0036876 A1* | 2/2008 | Kaneda et al. | 348/230.1 |
| 2010/0149398 A1* | 6/2010 | Gayer | 348/333.01 |

* cited by examiner

*Primary Examiner* — Kelly L Jerabek
(74) *Attorney, Agent, or Firm* — Cha & Reiter, LLC

(57) ABSTRACT

A method and an apparatus for operating a camera function in a portable terminal are provided. State information representing at least one of a direction and a rotation state of the portable terminal is obtained, and at least one of a sequence of reading an image from a camera sensor and an appropriate user interface is determined depending on the state information. Thus, the camera function is performed depending on the determined sequence or user interface.

19 Claims, 10 Drawing Sheets

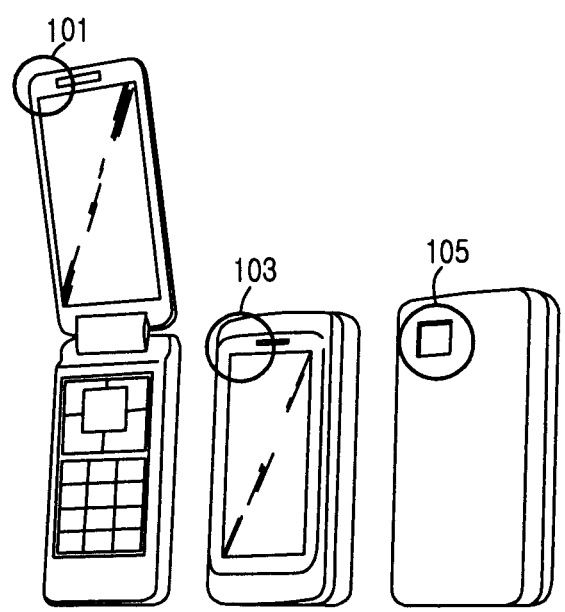
FIG.1  [Related Art]

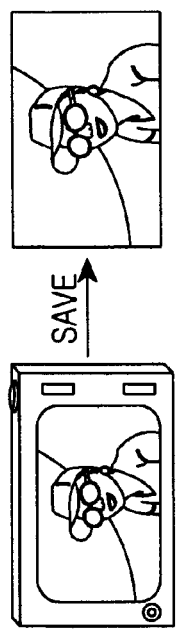
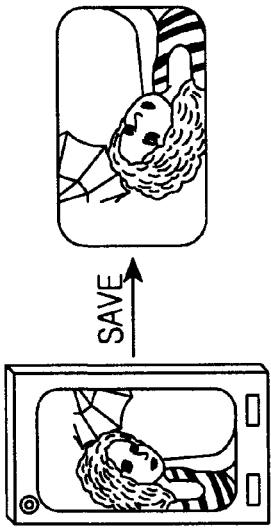
FIG.2A (0°)
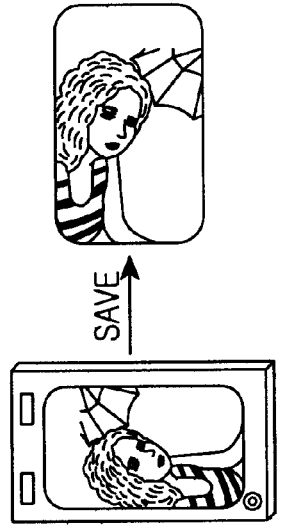
FIG.2B (90°)
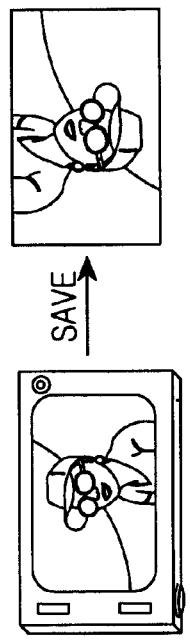
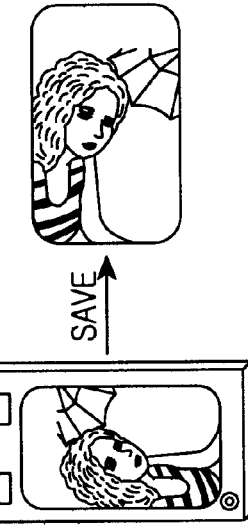
FIG.2C (180°)
FIG.2D (270°)
[Related Art]

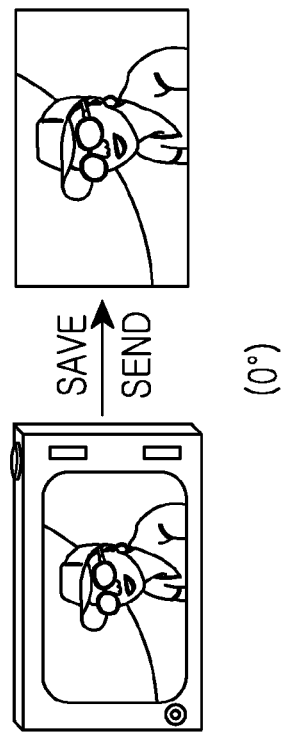
FIG.7A (0°)
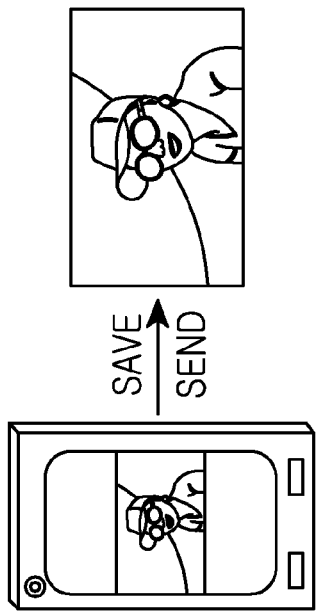
FIG.7B (90°)
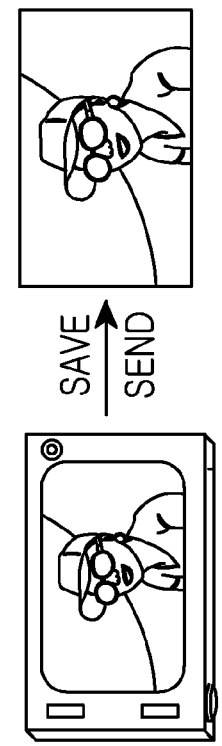
FIG.7C (180°)
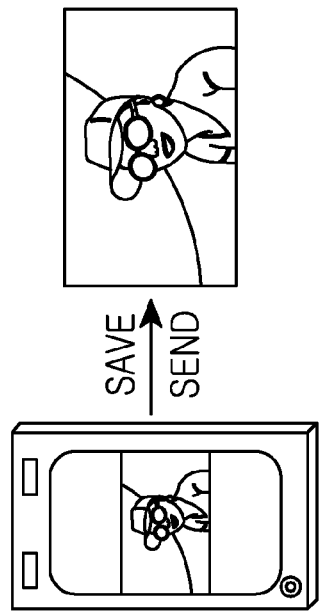
FIG.7D (270°)

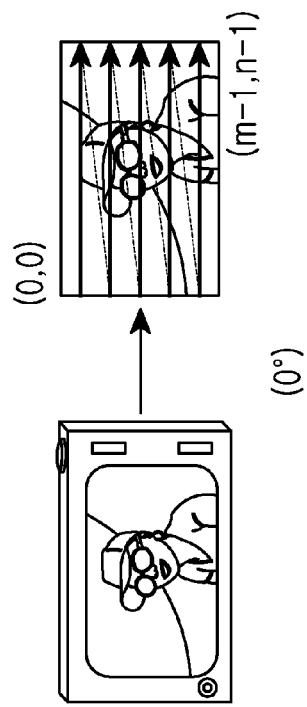
FIG.9A (0°)
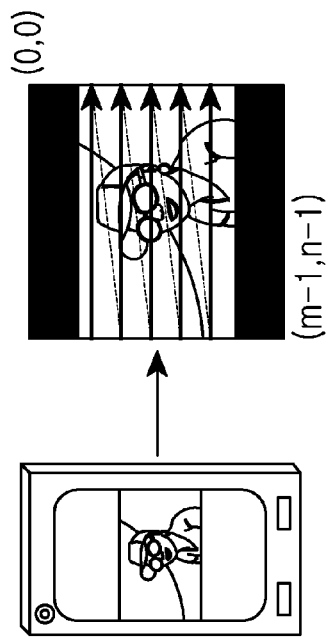
FIG.9B (90°)
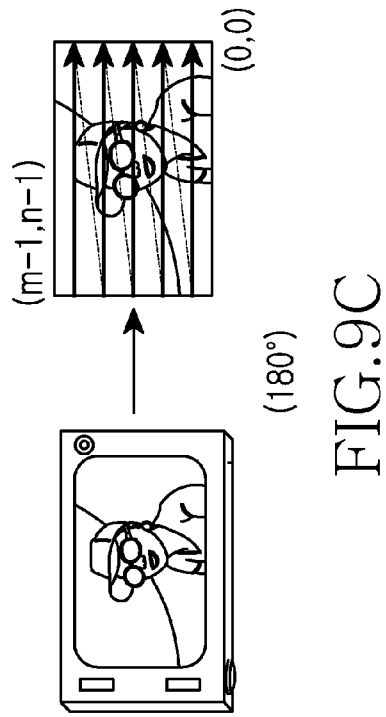
FIG.9C (180°)
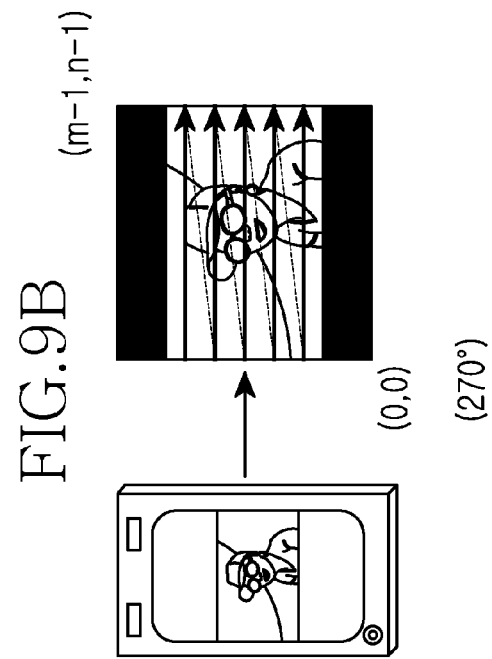
FIG.9D (270°)

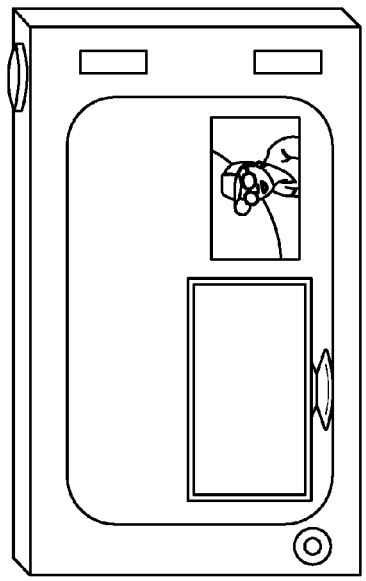
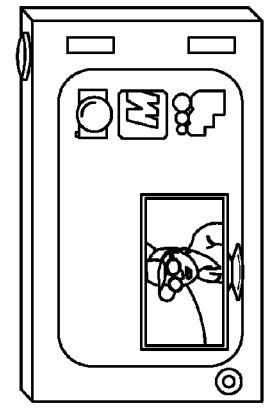
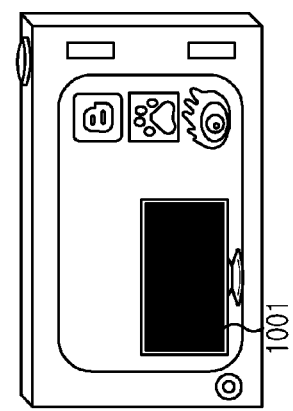
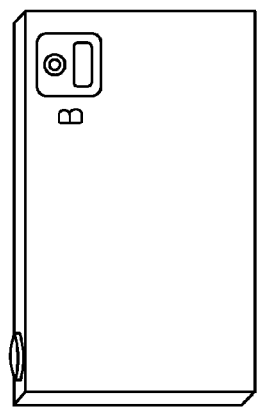
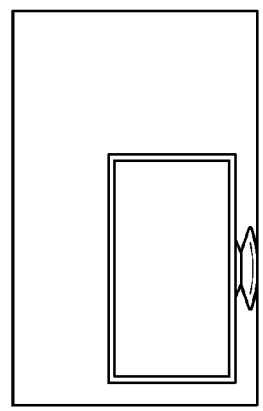
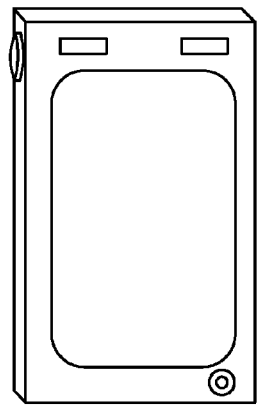
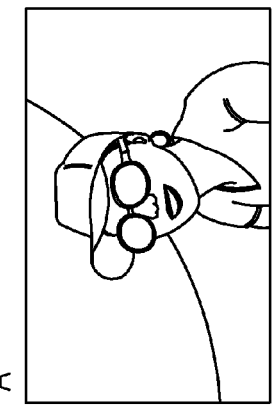
FIG.10A
FIG.10B

METHOD AND APPARATUS FOR OPERATING CAMERA FUNCTION IN PORTABLE TERMINAL

CLAIM OF PRIORITY

This application claims the benefit under 35 U.S.C. §119 of a Korean patent application filed in the Korean Intellectual Property Office on Jun. 7, 2010 and assigned Serial No. 10-2010-0053223, the entire disclosure of which is hereby incorporated by reference.

BACKGROUND OF THE INVENTION

1. Field of the Invention

The present invention relates to a method and an apparatus for operating a camera function in a portable terminal based on a sensor.

2. Description of the Related Art

Recently, as users' interest in a digital camera rapidly increases, portable terminals mounting a plurality of cameras therein are being provided. These cameras are used for capturing images at different angles or for a different purpose. For example, as illustrated in FIG. 1, cameras 101, 103, and 105 are typically provided in a folder inner portion, a front side, and a rear side, respectively. The camera 101 mounted in the folder inner portion is used for video communication, the camera 103 mounted in the front side is used for capturing images of the user, and the camera 105 mounted in the rear side is used for capturing a different object.

Most of cameras mounted in the conventional portable terminal are fixed at a specific position, thus have some drawbacks. In operation, the orientation of captured image may be changed due to the user's motion of rotating the portable terminal. For example, as illustrated in FIG. 2, when a user rotates a portable terminal mounting a camera unit therein by 90 degrees, 180 degrees, and 270 degrees and captures an image, the direction of an image displayed on a lens or a Liquid Crystal Display (LCD) screen and the direction of an image actually stored in the portable terminal are different from each other. That is, even when the direction of the portable terminal changes, the user cannot recognize the changed direction through the screen or lens, but the captured result image is rotated according to the direction of the portable terminal and stored or transferred to a different apparatus.

Meanwhile, since most of portable terminals are configured for right-handed users, left-handed users have an inconvenience in using the portable terminal. For example, a portable terminal has a shutter button for capturing at a position that is easy to use with a right hand, and accordingly, a left-handed user has an inconvenience of having to press the shutter button located at the position that is difficult to press with a left hand, or press the shutter button with an unfamiliar right hand.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for operating a camera function based on a sensor in a portable terminal.

Another aspect of the present invention is to provide a method and an apparatus for operating a multi-camera according to state information of a terminal based on a sensor in the portable terminal.

Still another aspect of the present invention is to provide a method and an apparatus for a user interface according to state information of a terminal based on a sensor in the portable terminal.

Yet another aspect of the present invention is to provide a method and an apparatus for displaying and storing a captured image according to state information of a terminal based on a sensor in the portable terminal.

Further yet another aspect of the present invention is to provide a method and an apparatus for providing various capturing techniques using a multi-camera in a portable terminal.

In accordance with an aspect of the present invention, a method for operating a camera function in a portable terminal includes executing a camera application, obtaining state information representing at least one of a direction and a rotation state of the portable terminal, determining at least one of a sequence of reading an image from a camera sensor and a user interface depending on the state information, and performing the camera function depending on the determined sequence or user interface.

In accordance with another aspect of the present invention, an apparatus for operating a camera function in a portable terminal includes a state information recognizer for, when a camera application is executed, obtaining state information representing at least one of a direction and a rotation state of the portable terminal, and a controller for determining at least one of a sequence of reading an image from a camera sensor and a user interface depending on the state information, and controlling the camera function depending on the determined sequence or user interface.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which:

FIG. 1 is a view illustrating a portable terminal mounting a multi-camera therein;

FIG. 2 shows views illustrating result images captured according to a rotation state of a terminal in the conventional portable terminal;

FIGS. 7A to 7D are views illustrating result images captured according to a rotation state of a terminal in the portable terminal according to an exemplary embodiment of the present invention;

FIGS. 9A to 9D are views illustrating a sequence of reading an image depending on a rotation state in a portable terminal according to an exemplary embodiment of the present invention; and FIGS. 10A and 10B are views illustrating an example of operating a multi-camera and capturing an image in a portable terminal according to an exemplary embodiment of the present invention.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. Also, descriptions of well-known functions and constructions are omitted for clarity and conciseness.

Hereinafter, a case where the camera is fixedly mounted on a predetermined position of a portable terminal is exemplarily described. Accordingly, in the following description, the state information, i.e., the direction or rotation state of the portable terminal denotes the direction or rotation state of the camera mounted in the portable terminal.

Figure 3:
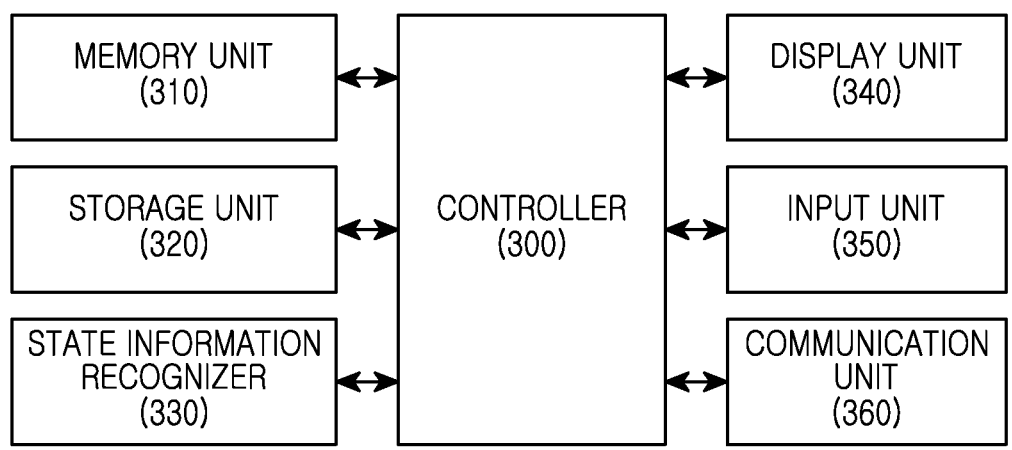
FIG. 3 is a block diagram illustrating a portable terminal according to an exemplary embodiment of the present invention.

FIG. 3 is a block diagram illustrating a portable terminal according to an exemplary embodiment of the present invention.

Referring to FIG. 3, the portable terminal includes a controller 300, a camera unit 310, a storage unit 320, a state information recognizer 330, a display unit 340, an input unit 350, and a communication unit 360.

The controller 300 controls an overall operation of the portable terminal. More particularly, the controller 300 determines a capture camera depending on the state information of the portable terminal, determines and changes a user interface for controlling a camera function, determines an output sequence of an image signal input from a camera sensor to control and process a function for displaying and storing an image in the normal direction. Here, the state information of the portable terminal denotes the direction or rotation state of the portable terminal.

In operation, when the portable terminal has two or more cameras, the controller 300 may determine a camera to be used for capturing among the two or more cameras depending on the rotation state of the portable terminal. The controller 300 may determine the camera to be used depending on the type of an application executed by a user. In addition, the controller 300 controls a function for changing a user interface (for example, a shutter key/icon, a zoom control key/icon, and a capture key/icon) depending on the rotation state of the portable terminal. Moreover, the controller 300 determines an output sequence of an image signal input from a camera sensor depending on the rotation state of the portable terminal and displays an input image on the screen in the normal direction as illustrated in FIGS. 7A to 7D, and simultaneously, controls and processes a function for storing the input image in the normal direction. Here, the output sequence of the input image signal denotes a sequence in which the controller 300 reads an image from the camera sensor.

Furthermore, the controller 300 controls a function for displaying an image such that the captured image stored in the storage unit 320 is displayed in the normal direction when the user views the image. In addition, the controller 300 controls a function for capturing an image in a Picture In Picture (PIP) mode using a plurality of cameras.

Figure 4:
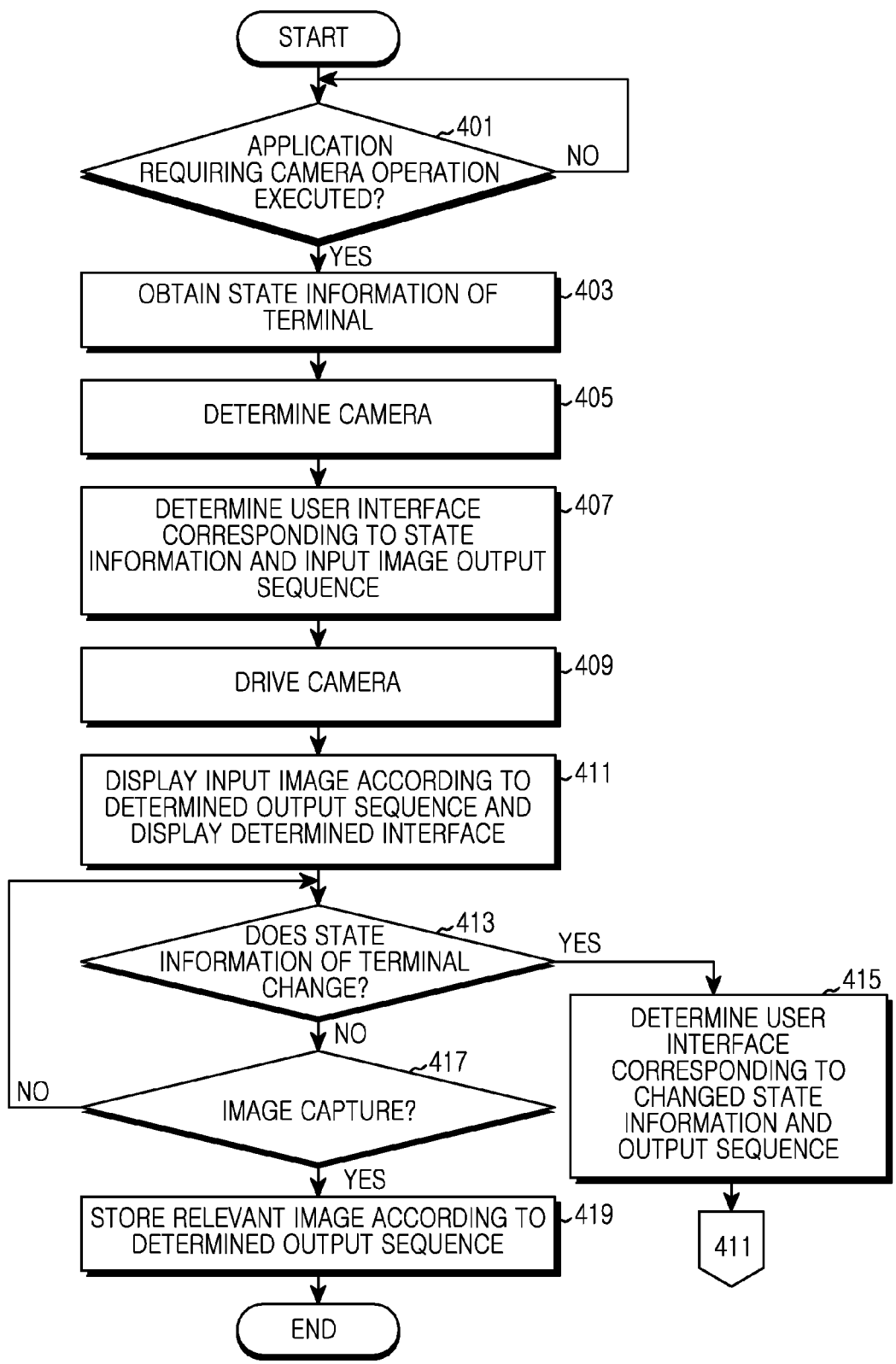
FIG. 4 is a flowchart illustrating a procedure for performing a camera function depending on a rotation state in a portable terminal according to an exemplary embodiment of the present invention.
Figure 5:
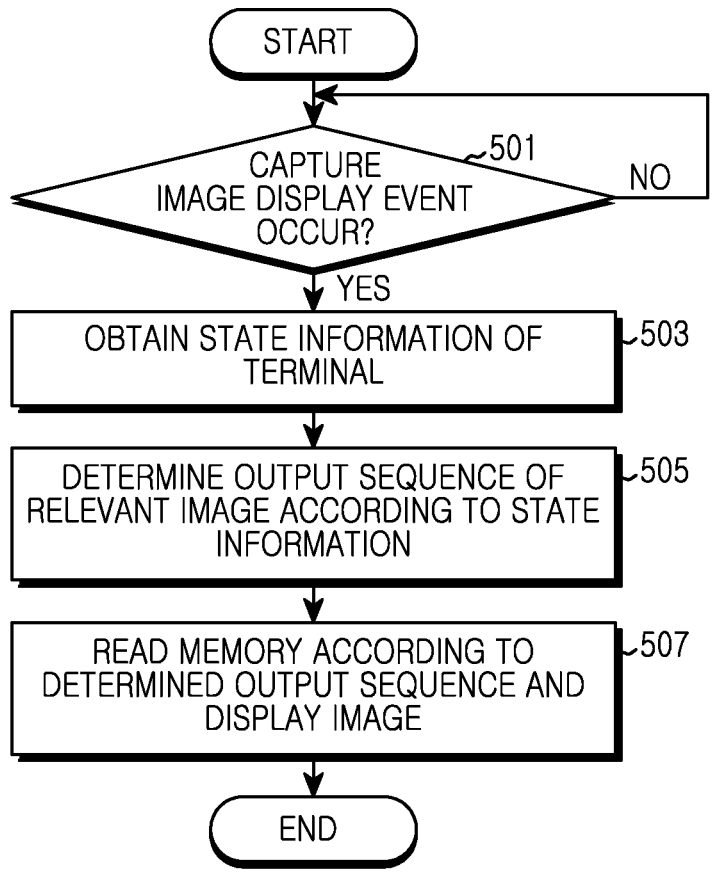
FIG. 5 is a flowchart illustrating a procedure for displaying an image depending on a rotation state in a portable terminal according to an exemplary embodiment of the present invention.
Figure 6:
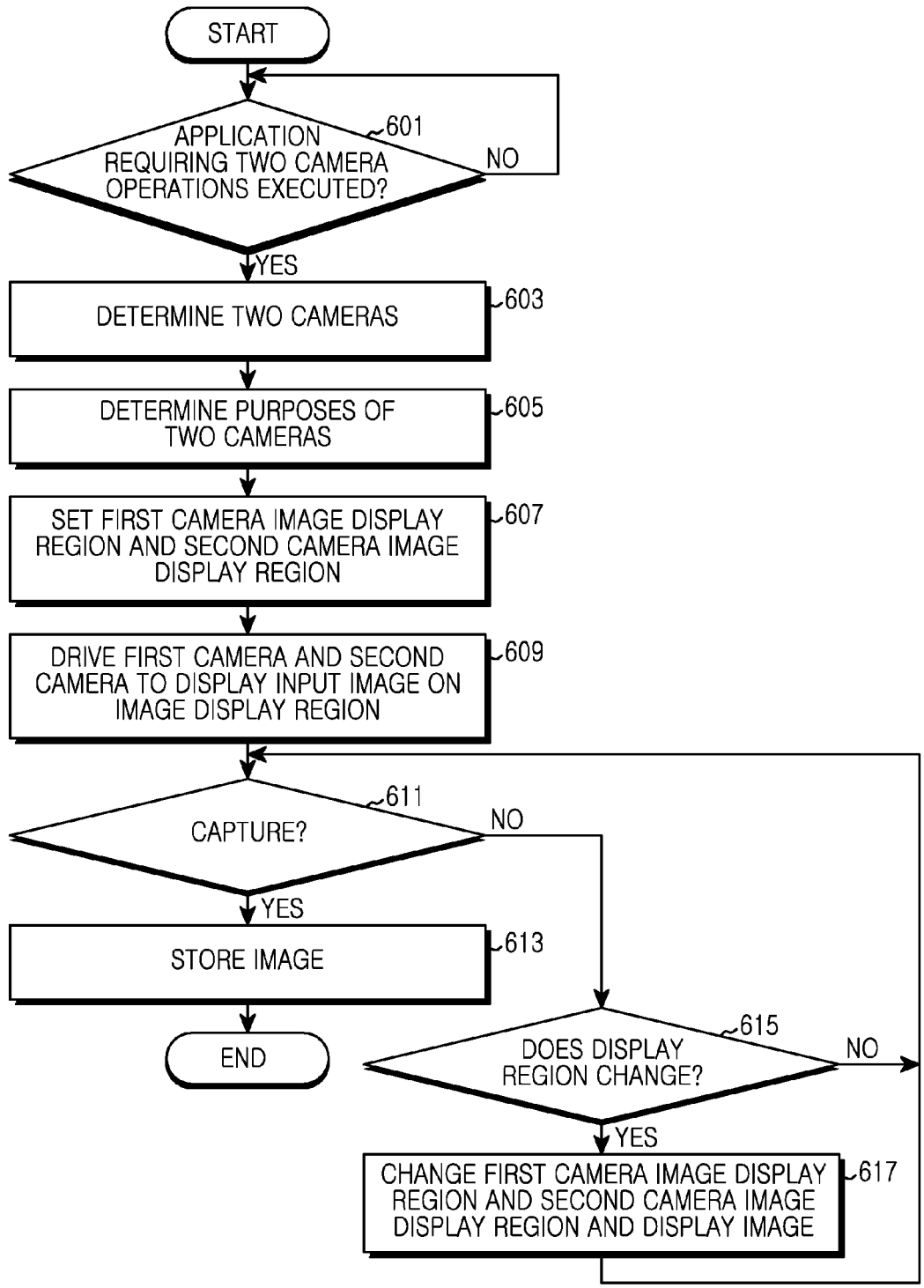
FIG. 6 is a flowchart illustrating a procedure for operating a multi-camera and capturing an image in a portable terminal according to an exemplary embodiment of the present invention.

The controller 300 controls and processes various functions for performing operations illustrated in FIGS. 4 to 6.

The camera unit 310 includes at least one camera, drives a camera for capturing under control of the controller 300, and provides an image signal input via a sensor of the driven camera to the controller 300. The camera unit 310 provides an image signal input via the sensor to the controller 300 according to an image signal output sequence determined by the controller 300. That is, when the output sequence determined by the controller 300 is a sequence corresponding to the normal direction, the camera unit 310 provides pixel information input from the camera sensor in the sequence of (0,0), (0,1), (0,2), . . . , (0,n−1), (1,0), (1,1), . . . , (m−1,n−2), (m−1,n−1) to the controller 300 as illustrated in FIG. 9A. When the output sequence determined by the controller 300 is a sequence corresponding to a 180-degree direction, the camera unit 310 provides pixel information input from the camera sensor in the sequence of (m−1,n−1), (m−1,n−2), (m−1, n−3), . . . , (m−2,n−1), (m−2,n−2), . . . , (0,2), (0,1), (0,0) to the controller 300 as illustrated in FIG. 9C.

The storage unit 320 stores various programs and data for an overall operation of the portable terminal, and stores a captured image under control of the controller 300. Here, the size of a memory map for storing the captured image in the storage unit 320 may correspond to a maximum number of the horizontal pixels of the camera. For example, when a maximum number of horizontal pixels of the camera is m, the memory map of the camera has a size of m.times.m for preventing an angle of view from being lost depending on the rotation state of the portable terminal. For example, when the size of the memory map storing the captured image is fixed according to the horizontal direction of the portable terminal, when the portable terminal performs a vertical capturing operation, since a horizontal-to-vertical ratio becomes different, this configuration of the memory map size prevents an angle of view from being lost. That is, when a camera memory map is fixed to 320.times.240 according to the horizontal direction of the portable terminal, when the portable terminal performs a vertical capturing operation, the horizontal-to-vertical ratio of a captured image changes to 240.times.320, and consequently, the captured image is reduced to 240.times.160 according to the horizontal-to-vertical ratio of fixed memory map. The configuration of the memory map size prevents this loss in the angle of view.

The state information recognizer 330 detects state information representing the direction or rotation state of the portable terminal, and provides the state information to the controller 300. Here, the state information recognizer 330 may detect the state information of the portable terminal using one of an accelerometer sensor, a gyroscope sensor, a horizontal angle measuring sensor, a touch sensor, and a user interface. That is, the state information recognizer 330 may detect the direction or rotation state of the portable terminal by measuring an angular velocity when the portable terminal rotates from a reference position using the accelerometer sensor. In addition, the state information recognizer 330 may detect the rotation state by measuring a horizontal angle of the portable terminal using the horizontal sensor. In addition, the state information recognizer 330 may detect the direction or rotation state of the portable terminal by recognizing applied pressure or static electricity using the touch sensor mounted on the surface of the portable terminal when a user of the portable terminal grips the portable terminal and analyzing the pattern of the surface contacted by the user's hand. In addition, the state information recognizer 330 may obtain state information of the portable terminal through an icon provided as a user interface or direction information selected or input by the user. Here, the state information recognizer 330 may use the above-described two or more methods in order to accurately detect the state information of the portable terminal.

The display unit 340 displays various state information, numbers, letters, and images occurring during an operation of the portable terminal. More particularly, the display unit 340 displays an image signal input from the camera unit 310 on a screen in real-time and displays a captured image stored in advance on the screen in the normal direction under control of the controller 300.

Figure 8A:
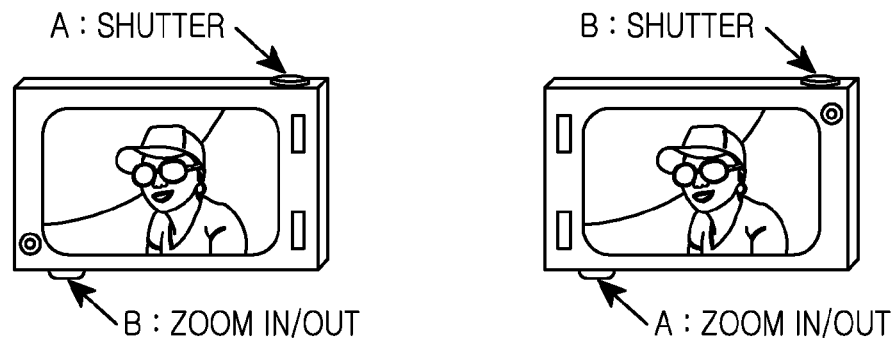
FIGS. 8A and 8B are views illustrating a user interface depending on a rotation state in a portable terminal according to an exemplary embodiment of the present invention.
Figure 8B:
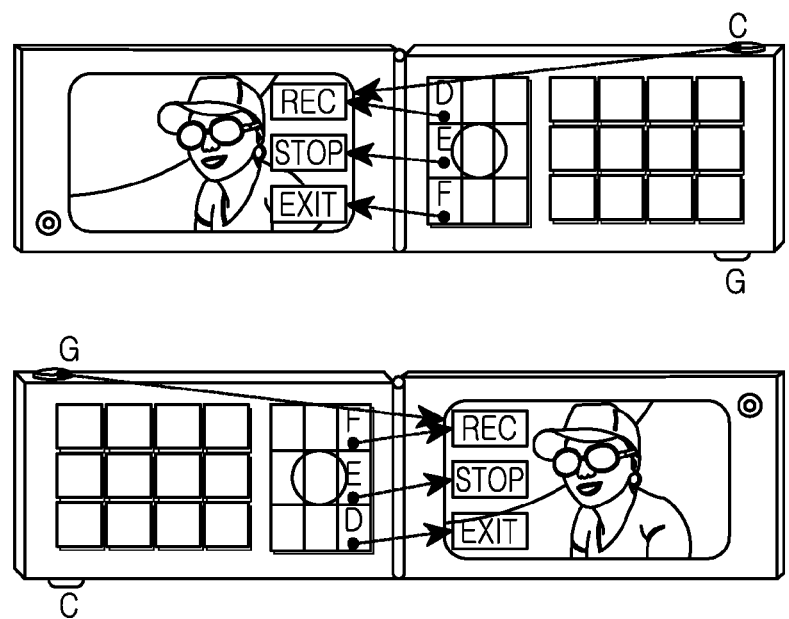

In addition, the display unit 340 may display information regarding a change in a user interface according to the state information of the portable terminal under control of the controller 300. That is, when the portable terminal performs an image capturing operation using a key, the display unit 340 may display to show that the function of each key has changed. When the portable terminal uses a touch screen, the display unit 340 may change and display capturing functions displayed on the screen depending on the rotation state of the portable terminal. For example, as illustrated in FIG. 8A, while the terminal does not rotate, the display unit 340 may display that a key A performs a shutter function and a key B performs a zoom function on a screen. When the terminal rotates by 180 degrees, the display unit 340 may display that the key B performs the shutter function and the key A performs the zoom function on the screen. In addition, as illustrated in FIG. 8B, while the portable terminal does not rotate, the display unit 340 may display a shutter icon on the right upper end of the screen. When the portable terminal rotates by 180 degrees, the display unit 340 may display the shutter icon on the left upper end of the screen. Further, the display unit 340 may display an image in a Picture In Picture (PIP) mode under control of the controller 300 as illustrated in FIGS. 10A and 10B.

The input unit 350 has at least one function key or touch sensor to provide data input by a user to the controller 300. That is, the input unit 350 provides data corresponding to a key pressed by a user to the controller 300 or provides the coordinate of a position touched by the user to the controller 300.

The communication unit 360 transmits/receives a signal to/from an external apparatus via a wired line or wirelessly under control of the controller 300. For example, the communication unit 360 may transmit a captured image to a different portable terminal connected wirelessly and may transmit a captured image to a computer system connected via a wired line under control of the controller 300.

FIG. 4 is a flowchart illustrating the process for performing a camera function depending on a rotation state in a portable terminal according to an exemplary embodiment of the present invention.

Referring to FIG. 4, in step 401, the portable terminal determines whether an application that requires a camera operation is executed, and if so, the portable terminal obtains the state information of the portable terminal, i.e., information representing the direction or rotation state through the state information recognizer 330 in step 403. Here, the rotation state of the portable terminal may be divided into a 0-degree rotation state, a 90-degree rotation state, a 180-degree rotation state, and a 270-degree rotation state. Accordingly, each rotation state includes ±45 degree. That is, when the portable terminal has a rotation state between 45 degrees and 135 degrees, the rotation state of the portable terminal may be determined as the 90 degrees. According to an exemplary embodiment of the present invention, description is made on the assumption that the case illustrated in FIG. 7A is a normal state of the portable terminal, i.e., a 0-degree rotate state.

When the state information of the portable terminal is obtained, the portable terminal proceeds to step 405 to determine a camera to be used for executing the application. For example, when the portable terminal includes a horizontal mode camera and a vertical mode camera, when the portable terminal rotates by 0 degree or 180 degrees, the portable terminal determines the horizontal mode camera. In contrast, when the portable terminal rotates by 90 degrees or 270 degrees, the portable terminal may determine the vertical mode camera. The horizontal mode camera has more horizontal pixels than vertical pixels, and therefore horizontal mode camera is more suitable for the images in which horizontal length is greater than vertical length. The vertical mode camera has more vertical pixels than horizontal pixels, and therefore vertical mode camera is more suitable for the images in which vertical length is greater than horizontal length. In addition, the portable terminal may determine the camera with consideration of whether the folder or slide of the portable terminal is opened and the executed application, and may simply determine the camera selected by the user through a key button or an icon provided to the portable terminal in step 405.

When the camera is determined, the portable terminal determines a user interface corresponding to state information of the portable terminal and an output sequence of an input image in step 407. That is, as illustrated in FIGS. 8A and 8B, the portable terminal determines the user interface used for capturing depending on the rotation state of the portable terminal. For example, as illustrated in FIG. 8A, while the portable terminal rotates by 0 degree, the portable terminal determines the user interface such that the key A performs the shutter function and the key B performs the zoom function. In contrast, when the portable terminal rotates by 180 degrees, the portable terminal determines the user interface such that the key B performs the shutter function and the key A performs the zoom function. In addition, as illustrated in FIG. 8B, while the portable terminal rotates by 0 degree, the portable terminal determines the user interface such that a shutter icon exists on the right upper end of the screen. In contrast, when the portable terminal rotates by 180 degrees, the portable terminal may determine the user interface such that the shutter icon exists on the left upper end of the screen. Further, the portable terminal determines a sequence in which an input image from the camera sensor is output on the screen. For example, when the portable terminal rotates by 0 degree, the portable terminal determines a normal direction sequence so that pixel information input from the camera sensor is output on the screen in the sequence of (0,0), (0,1), (0,2), . . . , (0,n−1), (1,0), (1,1), . . . , (m−1,n−2), (m−1,n−1) as illustrated in FIG. 9A. When the portable terminal rotates by 180, the portable terminal determines a 180-degree direction sequence so that pixel information input from the camera sensor is output on the screen in the sequence of (m−1,n−1), (m−1,n−2), (m−1,n−3), . . . , (m−2,n−1), (m−2,n−2), . . . , (0,2), (0,1), (0,0) as illustrated in FIG. 9C.

The portable terminal drives the determined camera in step 409, and displays an input image on the screen according to the determined output sequence and displays the determined user interface on the screen in step 411.

The portable terminal determines whether the state information of the portable terminal changes in step 413. That is, the portable terminal determines whether the portable terminal rotates according to the user's motion while the portable terminal drives the camera and performs a screen display operation.

When the state information of the portable terminal changes, the portable terminal proceeds to step 415 to determine a user interface and an input image output sequence depending on the changed state information and returns to step 411.

In contrast, when the state information of the portable terminal does not change, the portable terminal proceeds to step 417 to determine whether an image capture event occurs. For example, the portable terminal determines whether a shutter key or a shutter icon is input, or whether a predetermined automatic capture condition is met. When the image capture event does not occur, the portable terminal returns to step 413 to re-perform subsequent steps.

When the image capture event occurs, the portable terminal proceeds to step 419 to store a relevant image according to the determined input image output sequence. For example, as illustrated in FIGS. 9A to 9D, the portable terminal stores a relevant image in the storage unit 320 according to the image output sequence determined depending on the rotation state of the portable terminal. Therefore, as illustrated in FIGS. 7A to 7D, the portable terminal may store a captured image such that the image is always stored in the normal direction even when the portable terminal captures the image in a rotated state.

FIG. 5 is a flowchart illustrating the process for displaying an image depending on a rotation state in a portable terminal according to an exemplary embodiment of the present invention.

Referring to FIG. 5, the portable terminal determines whether an event for displaying a captured image occurs in step 501. For example, the portable terminal determines whether a view menu for viewing a captured image stored in the portable terminal is selected.

When the event for displaying the captured image occurs, the portable terminal obtains the state information of the portable terminal, i.e., information representing the direction or rotation state in step 503.

The portable terminal determines an output sequence of a relevant captured image depending on the state information in step 505. For example, when the state information represents 0-degree rotation state, the portable terminal determines output on the screen in the sequence of (0,0), (0,1), (0,2), . . . , (0,n−1), (1,0), (1,1), . . . , (m−1,n−2), (m−1,n−1) as illustrated in FIG. 9A. When the state information represents 180-degree rotation state, the portable terminal determines output on the screen in the sequence of (m−1,n−1), (m−1,n−2), (m−1, n−3), . . . , (m−2,n−1), (m−2,n−2), . . . , (0,2), (0,1), (0,0) as illustrated in FIG. 9C, and the portable terminal reads the relevant captured image from the storage unit 320 and displays the same on the screen according to the determined output sequence in step 507. Accordingly, the user may view a captured image displayed in the normal direction even when the portable terminal rotates.

FIG. 6 is a flowchart illustrating the process for operating a multi-camera and capturing an image in a portable terminal according to an exemplary embodiment of the present invention.

Referring to FIG. 6, the portable terminal determines whether an application that requires operations of two cameras is executed in step 601. For example, the portable terminal determines whether a PIP mode capture menu is selected.

When the application that requires the operations of the two cameras is executed, the portable terminal determines two cameras to be used for the application in step 603. Here, the portable terminal may determine the two cameras with consideration of the state information of the portable terminal, whether a folder or a slide is opened, and the executed application. Alternatively, the portable terminal may simply determine a camera(s) selected by a user through a key button or an icon provided to the portable terminal.

Thereafter, the portable terminal determines the purposes of the two cameras in step 605. For example, as illustrated in FIG. 10B, the portable terminal may determine one of the two cameras for the purpose of a background image capturing, and may determine the other camera for the purpose of a sub image capturing. Such purposes of the cameras may be automatically determined depending on a camera position mounted on the portable terminal, or may be manually selected by a user. That is, the portable terminal may determine a camera mounted in the rear side for the purpose of a background image capturing, and may determine a camera mounted in the front side for the purpose of a sub image capturing.

The portable terminal determines a first camera image display region and a second camera image display region in step 607. Here, the two camera image display regions may be automatically determined according to a predetermined scheme, and may be manually determined by a user. The portable terminal drives the first camera to display an image input from the first camera on the first camera image display region, and drives the second camera to display an image input from the second camera on the second camera image display region in step 609. For example, the portable terminal determines a camera mounted in the front side of the portable terminal as a camera for a sub capturing, determines a camera mounted in the rear side of the portable terminal as a camera for a background capturing, displays an image input from the camera for the background capturing as a background image of the screen, and displays an image input from the camera for the sub capturing on a predetermined region of the background image as illustrated in FIG. 10A. Here, as illustrated in FIG. 4, the portable terminal may configure a user interface depending on the state information of the portable terminal, and may determine an output sequence of an image signal input from each camera sensor depending on the state information of the portable terminal.

The portable terminal determines whether an image capture event occurs in step 611. For example, the portable terminal determines whether a shutter key or a shutter icon is input, or whether an automatic capture condition set in advance is met. When the image capture event does not occur, the portable terminal determines whether an event for changing an image display region occurs according to user manipulation in step 615. When the display region change event does not occur, the portable terminal returns to step 611. When the display region change event occurs, the portable terminal proceeds to step 617 to change the first camera image display region and the second camera image display region and display an image input from each camera according to the user manipulation, and then returns to step 611.

When the image capture event occurs, the portable terminal proceeds to step 613 to store a relevant image according to the determined input image output sequence, and ends the algorithm according to an exemplary embodiment of the present invention.

In the above, a method for maintaining an image in the normal direction by controlling a sequence of reading an image from a camera sensor depending on the rotation state of the portable terminal has been described using a case where a camera is fixedly mounted in the portable terminal as an example. However, when the camera mounted in the portable terminal is not fixed, a predetermined pendulum is mounted such that the center of mass is directed to the lower portion of a camera module, and the camera module is made rotatable, so that the camera always maintains a horizontal state and thus maintains an image in the normal direction even when the sequence of reading an image from the camera sensor is not controlled.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Exemplary embodiments of the present invention provide effects of detecting the rotation state of a camera and automatically changing a camera image in the normal direction to provide the same to a user and store the same, thus providing a more convenient interface to the user depending on the rotation state of the camera. This is achieved by operating a camera function depending on the state information of a sensor-based portable terminal in the portable terminal. In addition, exemplary embodiments may be usefully utilized for even the case of using a web cam function that uses a camera of the portable terminal, and may be usefully utilized for the case of synthesizing a screen using a plurality of cameras. Further, even when a cable, a memory card, and USB devices are mounted in the portable terminal and so an installation direction of the camera is limited due to space constraints, the direction of the portable terminal may be changed and used, so that usability improves.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a camera function in a portable device, the method comprising:
    obtaining state information representing at least one of a direction and a rotation state of the portable device;
    determining a sequence of reading an image from a camera sensor, and a user interface, depending on the state information, wherein an image capturing function of a user interface key is changed from a camera shutter function to a zoom function in response to a change in the state information; and
    performing the camera function depending on the user interface.

2. The method of claim 1, wherein the state information is obtained using at least one of an accelerometer sensor, a gyroscope sensor, a horizontal angle measuring sensor, a touch sensor, and a user interface.

3. The method of claim 1, wherein the performing of the camera function depending on the determined sequence comprises:
    displaying an image input from the camera sensor on a screen according to the determined sequence; and
    storing a relevant image according to the determined sequence.

4. The method of claim 1, wherein the determining of the user interface depending on the state information comprises changing a region for displaying at least one capture icon displayed on a screen depending on the state information.

5. The method of claim 1, further comprising determining at least one camera to operate among a plurality of cameras mounted in the portable device using at least the state information of the portable device.

6. The method of claim 1, wherein the state information represents one of a horizontal orientation mode, a vertical orientation mode, a 0-degree rotation state, a 90-degree rotation state, a 180-degree rotation state and a 270-degree rotation state.

7. The method of claim 1, wherein the sequence of reading an image from a camera sensor is selectively determined based on the state information so that an orientation of an input image is stored and displayed in the portable device is in the same direction.

8. The method of claim 1, wherein:
    the user interface key is a first key disposed at a top portion of the portable device when the portable device is in a first orientation, the first key operative as a shutter key in the first orientation of the portable device;
    the portable device comprises a second user interface key disposed at a bottom portion thereof and operative as a zoom key when the portable device is in the first orientation; and
    when an orientation of the portable device is detected in a second orientation, the first key is operative as a zoom key and the second key is operative as a shutter key.

9. The method of claim 8, wherein:
    when the portable device is in the first orientation, the first key is disposed at an upper right portion of the portable device and the second key is disposed at a lower left portion of the portable device; and
    the second orientation is a 180° rotation with respect to the first orientation, such that in the second orientation, the second key is disposed at an upper right portion of the portable device and the first key is disposed at a lower left portion of the portable device.

10. A method for operating a camera function in a portable device comprising at least two cameras, the method comprising:
    obtaining state information representing at least one of a direction and a rotation state of the portable device;
    determining a sequence of reading an image from a camera sensor, and a user interface, depending on the state information, wherein an image capturing function of a user interface key is changed from a first function to a second function in response to a change in the state information; and
    performing the camera function depending on the user interface;
    activating a picture in picture (PIP) mode responsive to at least one of a change in the state information of the portable device, a change in an open/closed position of a folder or responsive to a slide of the portable device;
    wherein in the PIP mode, a region is determined for displaying input images of each of the cameras, and an image input from each camera is displayed in the determined region.

11. A portable device, comprising:
a state information recognizer for obtaining state information representing at least one of a direction and a rotation state of the portable device; and
a controller for determining a sequence of reading an image from a camera sensor and a user interface depending on the state information, and controlling the camera function for capturing, storing and displaying an input image depending on the sequence and user interface;
wherein an image capturing function of a user interface key is changed from a camera shutter function to a zoom function in response to a change in the state information.

12. The portable device of claim 11, wherein the state information is obtained using at least one of an accelerometer sensor, a gyroscope sensor, a horizontal angle measuring sensor, a touch sensor, and a user interface.

13. The portable device of claim 11, wherein the controller displays an image input from the camera sensor on a screen according to the determined sequence and stores a relevant image according to the determined sequence.

14. The portable device of claim 11, wherein a memory map for storing the input image from the camera sensor has a size corresponding to a maximum number of horizontal pixels of the portable device.

15. The portable device of claim 11, wherein the controller changes a region for displaying at least one capture icon displayed on a screen from a right side region in a first orientation of the portable device to a left side region in a second orientation of the portable device that is 180° rotated with respect to the first orientation as determined from the state information.

16. The portable device of claim 11, further comprising a plurality of cameras, wherein the controller determines at least one camera to operate among the plurality of cameras using at least the state information of the portable device.

17. The portable device of claim 11, wherein the sequence of reading the input image from a camera sensor is selectively determined based on the state information so that an orientation of an input image is stored and displayed in the portable device is in the same direction.

18. A portable device, comprising:
at least two cameras;
a state information recognizer for obtaining state information representing at least one of a direction and a rotation state of the portable device; and
a controller for determining a sequence of reading an image from a camera sensor and a user interface depending on the state information, controlling the camera function for capturing, storing and displaying an input image depending on the sequence and user interface, and activating a picture in picture (PIP) mode responsive to at least one of a change in the state information of the portable device, a change in an open/closed position of a folder or responsive to a slide of the portable device;
wherein an image capturing function of a user interface key is changed from a first function to a second function in response to a change in the state information, and
wherein in the PIP mode, a region is determined for displaying input images of each of the cameras, and an image input from each camera is displayed in the determined region.

19. A method for operating a camera function in a portable device comprising at least two cameras, the method comprising:
obtaining state information representing at least one of a direction and a rotation state of the portable device;
determining each of a sequence of reading an image from a camera sensor, and a user interface, according to the state information; and
activating a picture in picture (PIP) mode responsive to at least one of a change in the state information of the portable device, a change in an open/closed position of a folder or responsive to a slide of the portable device;
wherein in the PIP mode, a region is determined for displaying input images of each of the cameras, and an image input from each camera is displayed in the determined region.

* * * * *